(12) United States Patent  (10) Patent No.: US 7,607,070 B2
Clark et al.  (45) Date of Patent: Oct. 20, 2009

(54) SYSTEM AND METHOD FOR IN-LINE CONSISTENCY CHECKING OF PACKETIZED DATA

(75) Inventors: Chris A. Clark, Madison, WI (US); Scott B. Kovner, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 449 days.

(21) Appl. No.: 10/939,858

(22) Filed: Sep. 13, 2004

(65) Prior Publication Data

US 2006/0059400 A1 Mar. 16, 2006

(51) Int. Cl.
*H03M 13/00* (2006.01)
(52) U.S. Cl. .................... 714/776; 714/774; 714/779
(58) Field of Classification Search ................ 714/776, 714/774, 779
See application file for complete search history.

(56) References Cited

U.S. PATENT DOCUMENTS

| 4,534,061 | A | * | 8/1985 | Ulug ........................... 455/17 |
| 4,712,215 | A | * | 12/1987 | Joshi et al. .................. 714/776 |
| 5,119,367 | A | * | 6/1992 | Kawakatsu et al. ......... 370/232 |
| 5,206,638 | A | * | 4/1993 | McKeown .................. 370/446 |
| 5,303,302 | A | * | 4/1994 | Burrows ..................... 713/161 |
| 5,559,778 | A | * | 9/1996 | Inokuchi et al. ........... 369/53.24 |
| 6,081,847 | A | * | 6/2000 | Lin ............................. 709/250 |
| 6,324,178 | B1 | * | 11/2001 | Lo et al. ...................... 370/392 |

(Continued)

OTHER PUBLICATIONS

Cheng, P; Lo, B B ; Pan, A L; Information transfer method for networked communication system, involves appending pointer indicating start and length of previous data packet stored in memory with header section of current packet; Derwent.*

(Continued)

*Primary Examiner*—Joseph D Torres
(74) *Attorney, Agent, or Firm*—Meyertons Hood Kivlin Kowert & Goetzel, P.C.; Jeffrey C. Hood

(57) ABSTRACT

A system and method for efficiently detecting and correcting transmission errors in packet-based communications by using cumulative error detection codes. The system may comprise a transmitting unit, which transmits one or more data packets. Each of the transmitted packets may comprise a plurality of transmission subunits. The transmitting unit preferably generates a cumulative error detection code (e.g., cumulative CRC code) for each of the transmission subunits of a packet. The system may further comprise a receiving unit to receive each of the transmission subunits of the packet. The receiving unit preferably generates a new cumulative error detection code for each of the received transmission subunits. The new cumulative error detection code is compared to the received cumulative error detection code to determine if any errors occurred in the transmission of the transmission subunit.

46 Claims, 8 Drawing Sheets

U.S. PATENT DOCUMENTS

| | | |
|---|---|---|
| 6,470,470 B2 | 10/2002 | Jarvinen et al. |
| 6,535,589 B1 | 3/2003 | Nauman et al. |
| 6,560,742 B1 | 5/2003 | Dubey et al. |
| 6,643,818 B1 | 11/2003 | Valk |
| 6,681,364 B1 | 1/2004 | Calvignac et al. |
| 6,804,218 B2 | 10/2004 | El-Maleh et al. |
| 6,804,257 B1 * | 10/2004 | Benayoun et al. ........... 370/471 |
| 6,820,232 B2 | 11/2004 | Kim et al. |
| 6,920,191 B2 * | 7/2005 | Hafeez et al. ............... 375/346 |
| 7,155,658 B2 * | 12/2006 | Huffman et al. ............ 714/776 |
| 2003/0145134 A1 | 7/2003 | Wehage et al. |
| 2003/0192003 A1 | 10/2003 | Das et al. |
| 2004/0153952 A1 | 8/2004 | Sharma et al. |

OTHER PUBLICATIONS

Stephen B. Wicker, Error Control Systems for Digital Communication And Storage, Prentice-Hall, 1995, p. 117.*

* cited by examiner

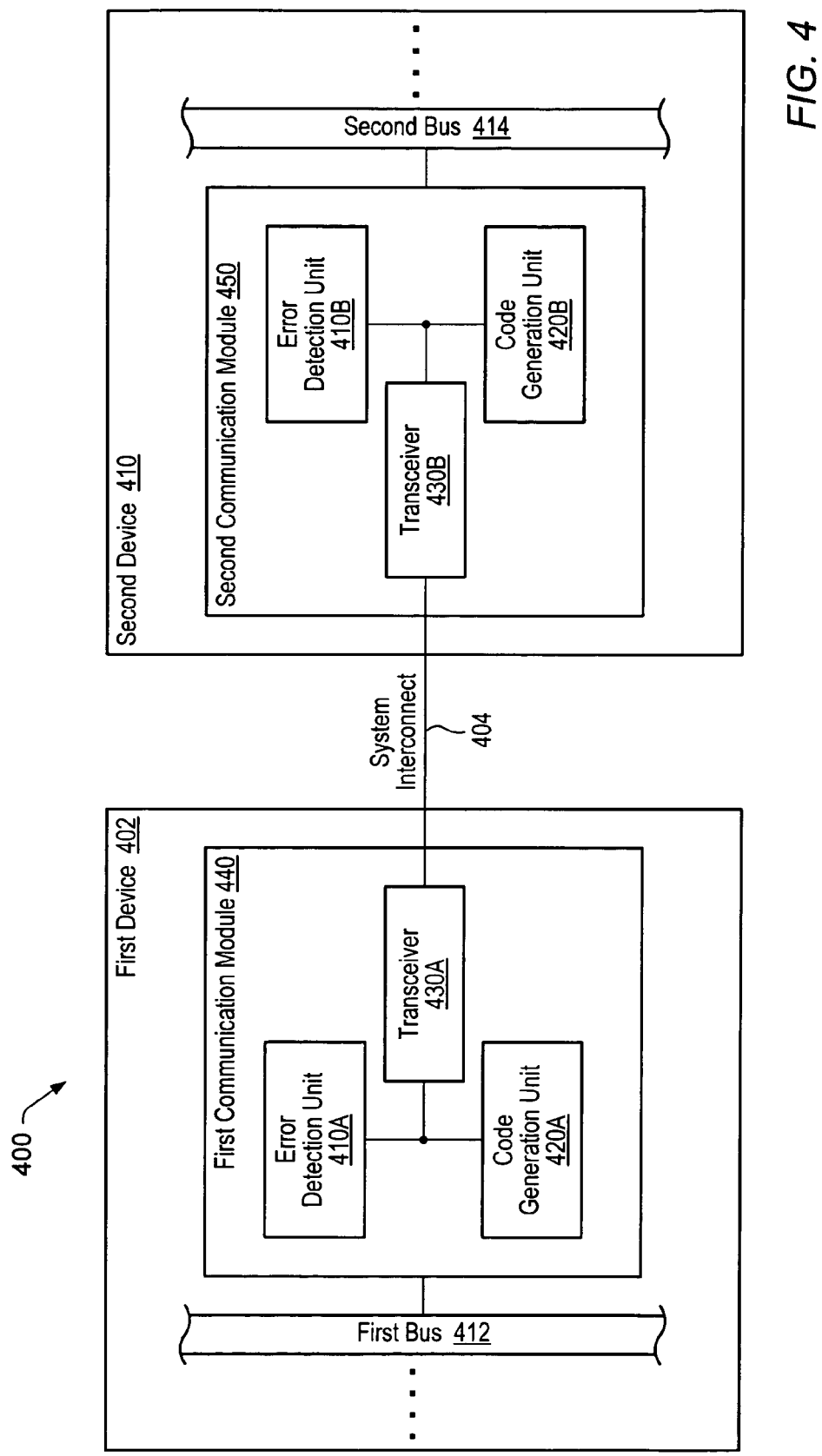

SYSTEM AND METHOD FOR IN-LINE CONSISTENCY CHECKING OF PACKETIZED DATA

BACKGROUND OF THE INVENTION

1. Field of the Invention

This invention relates to communication protocols and, more particularly, to a system and method for implementing a protocol for detecting and correcting transmission errors in packet-based communications.

2. Description of the Related Art

Various types of networks exist, such as local area networks (LANs), wide area networks (WANs), and the Internet, for transmitting packetized data. For example, the Internet is a "network of networks" based on a packet protocol referred to as Transmission Control Protocol/Internet Protocol (TCP/IP). Also, computer systems and other electronic devices generally include or use buses for the transfer of data between various sub-systems. Exemplary buses, include Peripheral Component Interconnect (PCI), Versa Module Europa (VME), Industry Standard Architecture (ISA), Extended Industry Standard Architecture (EISA), etc. Certain of these buses may also use a packet-based protocol.

In many systems, a first device (e.g., a host computer) may implement a packet-based communication protocol to communicate with a second device (e.g., a remote system) via a transmission medium (e.g., a network or serial link). For example, a first interface of the host computer, which is coupled to the transmission medium, may send a first packet to a second interface of the remote system, which is also coupled to the transmission medium.

In some implementations of packet-based communication protocols, each of the transmitted packets may comprise an error detection code. The error detection code of a transmitted packet is encoded data that is derived from the data comprised in the transmitted packet. For example, the error detection code may be a cyclic redundancy check (CRC) code or a checksum. The error detection code may be used as an error detection mechanism to detect errors in the transmission of a packet.

In a typical implementation, the host system may transmit a packet comprising data and an error detection code (e.g., CRC code) to a remote system. The remote system may receive and store each of the data transmissions associated with the packet and may generate a new error detection code based on the received data comprised in the received packet. Then, the remote system may compare the new error detection code with the received error detection code. The error detection codes should match if the transmitted data were neither lost nor corrupted. If a match is detected, the remote system consumes the data, which may involve further storing the data, sending the data to a device, and/or using the data for the purpose for which it was transmitted. However, if the error detection codes do not match, which may indicate that some of the data was lost or corrupted in the transmission, then the remote system may discard the data and may request a retransmission of the packet. In this implementation, the receiving system (e.g., the remote system) may accumulate or temporarily store all the received data comprised in the received packet to calculate the new error detection code. The accumulation of the data comprised in each of the received packets introduces latency to the packet-based transmission of the data.

Also, in the above-described implementation, a header may be sent at the beginning of each transmitted packet. The header provides the receiving system addressing information, sequence numbers, and other information associated with the transmitted packet. It is noted however that in other embodiments this information may be sent at the end of each transmitted packet. In packet-based transmissions of data, there is usually a trade-off between packet size and latency. More specifically, the greater the packet size, the greater the latency associated with the transmission because more data is accumulated. In this implementation, including the sequence number in the headers increases the size of the headers and increases the size of the packets, which increases the latency associated with the transmission of each packet.

One common I/O function or application domain where computer buses are used is in the area of instrumentation. An instrument is a device which collects data or information from an environment or unit under test (UUT) and optionally displays this information to a user, or which generates a signal, e.g., for stimulating a UUT. An instrument may also perform various data analysis and data processing on acquired data prior to displaying the data to the user. Examples of various types of instruments include data acquisition devices, oscilloscopes, digital multimeters, signal analyzers, signal generators, etc. The types of information that might be collected by respective instruments include voltage, resistance, distance, velocity, pressure, frequency of oscillation, humidity, temperature, image data, and audio data, among others.

Modern instrumentation systems are moving from dedicated stand-alone hardware instruments such as oscilloscopes, digital multimeters, etc., to a concept referred to as virtual instrumentation. Virtual instrumentation systems comprise instrumentation hardware such as circuit boards which plug into general purpose personal computers. The instrumentation hardware is controlled by software which executes on the computers. Many virtual instrument hardware devices have been developed which plug into a PCI bus, or into other buses that use PCI signaling protocols, such as Compact PCI (CPCI) or PCI extensions for Instrumentation (PXI). Other popular instrumentation buses are the VXI (VMEbus eXtensions for Instrumentation) bus and General Purpose Interface Bus (GPIB).

In many applications, often there is a need for the I/O function to be physically located remotely from the host computer. For example, in a measurement application, a data acquisition (DAQ) device may be required to be located in a test chamber which is separated by some distance from the host computer controlling it. As another example, one or more measurement devices may be installed in a chassis that is connected to a computer system. For another example, a notebook computer may use a docking station to couple to other devices which are typically located at the user's desk, where the docking station provides additional PCI expansion capability to the notebook computer. In other words, in many applications it is desirable that the corresponding system be implemented as a distributed system. Note that as used herein, the term "remote" may refer to separation distances between the host system and the remote device of anywhere from a few centimeters to hundreds or even thousands of meters. In other words, the term "remote" denotes that the remote device is coupled to, but distinct from, the host system.

One solution for remotely interfacing devices to a computer is the use of a PCI split bridge system. In a PCI split bridge system, the host computer includes a primary PCI bus and a first interface comprising a first portion of the bridge, the remote system includes a secondary PCI bus and a second interface comprising a second portion of the bridge, and the two systems are coupled via a transmission medium, e.g., a serial or parallel transmission cable. The first interface, the transmission medium, and the second interface may collectively comprise the bridge. In this manner, PCI devices attached to both of the PCI systems may be coupled seamlessly, or transparently, i.e., the PCI expansion devices coupled to the remote PCI bus may appear to the computer system as if they were coupled directly to the local PCI bus in the host computer system. In addition, some new expansion buses, such as PCI Express, use a "switched fabric" architecture that allows a host computer to interface to various remote devices.

SUMMARY OF THE INVENTION

Various embodiments of a system and method for implementing a protocol for efficiently detecting and correcting transmission errors in packet-based communications by using cumulative error detection codes are disclosed. More specifically, the system may be operable to implement an in-line consistency checking mechanism with respect to data comprised in each of the transmitted packets to detect and correct transmission errors.

In one embodiment, the system may comprise a first device (e.g., a host computer) and a second device (e.g., a remote system). The host computer may comprise a device configured to transmit one or more data packets via a system interconnect to the remote system. Each of the packets may comprise a plurality of transmission subunits; for example, a 640-bit packet may comprise four 160-bit subunits. The host computer may further comprise a code generation unit, which is coupled to the device and configured to generate a cumulative error detection code for each of the plurality of transmission subunits of a packet. For example, the cumulative error detection code may be cumulative cyclic redundant checking (CRC) code or cumulative checksums, among other error-checking methodologies. In one embodiment, the cumulative error detection code is cumulative across the plurality of transmission subunits of the packet. The cumulative error detection code for each of the transmission subunits of the packet may be generated based on the data comprised in the transmission subunit and a cumulative error detection code corresponding to zero or more previously transmitted transmission subunits of the packet. For example, the cumulative error detection code corresponding to zero or more previously transmitted transmission subunits of the packet may be a previously generated cumulative error detection code corresponding to an immediate previously transmitted transmission subunit of the packet.

In one embodiment, the remote system may comprise a remote device, which receives the plurality of transmission subunits associated with the one or more packets transmitted by the device of the host computer. Each of the received transmission subunits of the packet may comprise the data comprised in the received transmission subunit and the cumulative error detection code associated with the data. The remote system may further comprise a remote code generation unit, which generates a new cumulative error detection code for each of the received transmission subunits of the packet. In one embodiment, the new cumulative error detection code is cumulative across the plurality of received transmission subunits of the packet. The new cumulative error detection code for each of the received transmission subunits of the packet may be generated based on the received data comprised in the received transmission subunit and a new cumulative error detection code corresponding to zero or more previously received transmission subunits of the packet. For example, the new cumulative error detection code corresponding to zero or more previously received transmission subunits of the packet may be a previously generated new cumulative error detection code corresponding to an immediate previously received transmission subunits of the packet.

In one embodiment, the new cumulative error detection code is compared with the received cumulative error detection code to determine if an error occurred in the transmission of the transmission subunit. If the new cumulative error detection code matches the received cumulative error detection code, then the received data comprised in the received transmission subunit is consumed. However, if the new cumulative error detection code does not match the received cumulative error detection code, then the received data comprised in the received transmission subunit may be discarded. By consuming the data comprised in each transmission subunit that is transmitted successfully, all the data of the corresponding packet does not have to be accumulated. Therefore, the latency associated with the transmission of packetized data may be reduced.

In one embodiment, each of the transmitted packets comprises a header. The header may be comprised in one or more transmission subunits of a transmitted packet. Each of the headers of the transmitted packets preferably comprises a global transmission count (GTC), which equals the total or incremental size of all the data comprised in all the packets that have been transmitted since the previous initialization. In one embodiment, the remote device comprised in the remote system may compare a global reception count (GRC) to the received GTC comprised in the received header. The GRC is equal to the total or incremental size of all the data comprised in all the packets that have been received since the previous initialization. If the GRC is equal to the GTC, then the remote device may receive additional transmission subunits of a current packet associated with the received header. If the GRC is not equal to the received GTC, then the remote device may request a retransmission of a previously transmitted packet.

BRIEF DESCRIPTION OF THE DRAWINGS

FIG. 4 is a block diagram of one embodiment of a system for implementing the protocol for detecting and correcting transmission errors in packet-based communications via a first communication module and a second communication module;

Figure 1:
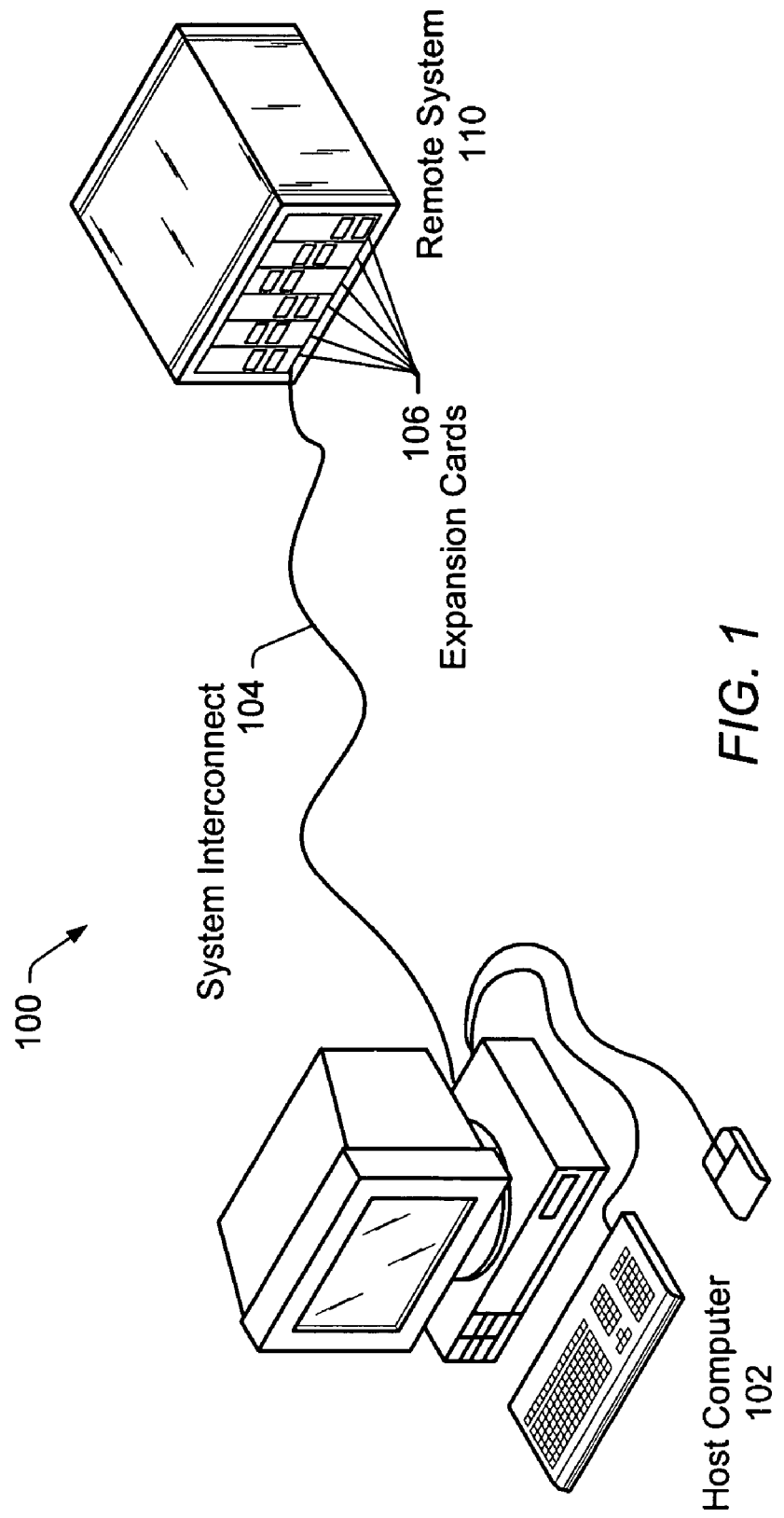
FIG. 1 illustrates one embodiment of a system for implementing a protocol for detecting and correcting transmission errors in packet-based communications.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION

A Distributed System

The techniques and methods disclosed herein are broadly applicable to any type of system that utilizes packet-based communication, such as, for example, computer-to-computer communication over a network, e.g., a deterministic triggering and messaging protocol across Ethernet, or any other packet-based communication between devices. Some of the descriptions below are directed to a host computer coupled to a remote device, e.g., in a distributed measurement or control system. However, it should be noted that this is but an exemplary embodiment, and is not intended to limit the invention to any particular domain, application, or devices. For example, the techniques and methods disclosed herein may also be utilized for inter-chip communications on a printed circuit board.

As used herein, the term "host computer" refers to a computer system (a first system or device) which is coupled to one or more other devices (e.g., expansion cards, another computer system, instruments, etc.). The host computer may include a serial bus primary interface, and may also execute device drivers for one or more expansion cards comprised in the system. In one embodiment, the host computer may communicate with a remote system using a packet-based communication protocol. It is noted however that in other embodiments the host computer may be an expansion chassis including one or more expansion modules or any other device.

As used herein, the term "remote system" or "remote chassis" refers to a second system or device, e.g., an expansion chassis which is located remotely from the host computer, and which may include a serial bus secondary interface, and any devices or expansion cards coupled to or comprised in the remote chassis. In other words, the expansion cards are preferably modules comprised in the remote chassis. As noted above, in other embodiments, the remote system may comprise another computer system, or any other device that communicates with the first system or device via packet-based communications.

The device drivers for these modules may run or execute on the host computer, as mentioned above. The device drivers comprise system software for the expansion cards in the remote chassis, and thus may provide an interface for applications to communicate with expansion cards.

Note that as used herein, the term "remote" may refer to separation distances between the host system and the remote system or device of anywhere from a few centimeters to hundreds or even thousands of meters. In other words, the term "remote" denotes that the remote system or device is coupled to, but distinct from, the host system. In one embodiment, the remote system may be located more than about two meters from the host computer system. In other embodiments, the remote system may be located tens, hundreds, or even thousands of meters from the host computer system. Thus, although in many of the embodiments described herein, the second system is a remote system located remotely from the host computer system, it is noted that in other embodiments, the second system may be proximate to the host computer system.

Turning now to FIG. 1, a diagram of one embodiment of a system 100 for implementing a protocol for detecting and correcting transmission errors in packet-based communications is shown. In one embodiment, system 100 may be configured as a distributed system and may comprise a host computer system 102 (i.e., a first system or chassis or device) coupled to a remote system 110 (i.e., a second system or chassis or device) via a system interconnect 104. The host system 102 may be a personal computer (PC) system. However it is noted that in other embodiments system 102 may be any of various types of computing or processing systems, including mainframe computer systems and workstations, or may be any of various types of devices, including Internet appliances, among others. The remote chassis 110 may be an expansion system including various expansion cards or modules 106, such as instrumentation cards or other peripheral or component cards. In one embodiment, the remote system 110 and/or system 102 may be PXI expansion systems comprising at least one PXI module and one or more PXI instrumentation cards. However, it is noted that in other embodiments the remote system 110 and/or system 102 may be other types of systems such as VXI systems. It is also noted that in other embodiments the protocol for detecting and correcting transmission errors in packet-based communications code may be implemented in other application domains, for example, deterministic triggering and messaging protocols across Ethernet or custom backplane protocols.

The system interconnect 104 may be a serial or a parallel bus and may be any of various types of physical connections, such as copper wire, coaxial cable, or fiber optic cable, among others. Although the PCI bus is used in the following descriptions of the present invention, this is not intended to limit the invention to any particular bus, i.e., any other bus may be used to implement various embodiments of the invention, including wireless or any other transmission means. Similarly, it is noted that although a distributed system is an exemplary application of the present invention, the systems and method described herein are broadly applicable to any applications implementing a packet-based communication protocol, including, for example, Ethernet applications.

In one embodiment, the host computer system 102 may include a local or first (primary) bus, such as a Peripheral Component Interconnect (PCI) bus. Various devices may be connected to the primary bus, such as a video or graphics card, a hard drive, instrumentation devices, or any other compatible peripheral device or card. Similarly, the remote chassis 110 may comprise a remote or second (secondary) bus, e.g., another PCI bus, and one or more peripheral devices or cards 106 coupled to the second bus. Thus, in one embodiment, the host computer 102 and the remote chassis 110 may comprise two bus systems located remotely from each other.

The host computer 102 may include at least one central processing unit or CPU, which is coupled to a processor or host bus. The CPU may be any of various types of processors, including an x86 processor, e.g., a Pentium™ class, a PowerPC™ processor, a CPU from the SPARC™ family of RISC processors, as well as others. The host computer 102 may also include one or more memory subsystems (e.g., Dynamic Random Access Memory (DRAM) devices) coupled to the host bus by means of memory controller. The memory subsystems may collectively form the main memory of system 102 from which programs primarily execute. The host computer 102 may further include host driver software for communication with the remote system 110.

As will be further described below with reference to FIG. 4-7, system 100 may implement the protocol for efficiently detecting and correcting transmission errors in packet-based communications by using cumulative error detection codes. More specifically, system 100 may implement an in-line consistency checking mechanism with respect to the data comprised in each of the transmitted packets to detect and correct transmission errors. In one embodiment, the host computer 102 may comprise a device (e.g., a PCI module), which transmits one or more data packets via the system interconnect 104 to a remote device (e.g., a PXI module) comprised in the remote system 110. Each of the packets may comprise a plurality of transmission subunits; for example, a 640-bit packet may comprise four 160-bit subunits. The host computer 102 may further comprise a code generation unit, which is coupled to the device and generates a cumulative error detection code for each of the plurality of transmission subunits of a packet. For example, the code generation unit (e.g., an encoder) may generate cumulative cyclic redundant checking (CRC) code. In one embodiment, the cumulative error detection code for each of the transmission subunits of the packet may be generated based on the data comprised in the transmission subunit and a cumulative error detection code corresponding to zero or more previously transmitted transmission subunits of the packet. For example, the cumulative error detection code corresponding to zero or more previously transmitted transmission subunits of the packet may be a previously generated cumulative error detection code corresponding to an immediate previously transmitted transmission subunits of the packet.

As described above, the host computer system 102 may be operable to transmit the plurality of transmission subunits of the one or more packets to the remote system 10 via the system interconnect 104. In one embodiment, the remote system 110 may comprise a remote device, which may receive the plurality of transmission subunits of the one or more packets. Each of the received transmission subunits of the packet may comprise the data comprised in the received transmission subunit and the cumulative error detection code associated with the data. The remote system 110 may further comprise a remote code generation unit, which may be coupled to the remote device and operable to generate a new cumulative error detection code for each of the received transmission subunits of the packet. In one embodiment, the new cumulative error detection code for each of the received transmission subunits of the packet may be generated based on the received data comprised in the received transmission subunit and a new cumulative error detection code corresponding to zero or more previously received transmission subunits of the packet. For example, the new cumulative error detection code corresponding to zero or more previously received transmission subunits of the packet may be a previously generated new cumulative error detection code corresponding to an immediate previously received transmission subunits of the packet.

In one embodiment, the new cumulative error detection code is compared with the received cumulative error detection code to determine if a transmission error occurred. If the new cumulative error detection code matches the received cumulative error detection code, then the received data comprised in the received transmission subunit may be consumed. However, if the new cumulative error detection code does not match the received cumulative error detection code, then the received data comprised in the received transmission subunit may be discarded. It is noted that by consuming the data comprised in each transmission subunit that is transmitted successfully, all the data of the corresponding packet does not have to be accumulated; therefore, the latency associated with the transmission of packetized data may be reduced.

The example of a distributed system for implementing the protocol that efficiently detects and corrects transmission errors in packet-based communications, which is briefly described above with reference to FIG. 1, is further described below with reference to FIG. 4-7. Note, however, that this implementation is meant to be exemplary only, and is not intended to limit the methods disclosed herein to any particular application domain. Rather, the techniques described herein are contemplated for use in a wide variety of applications, e.g., as described below with reference to FIGS. 2A and 2B, including, for example, synchronized motion control, synchronized measurement and data acquisition, and synchronized modeling and simulation, among others.

Exemplary Systems

Figure 2A:
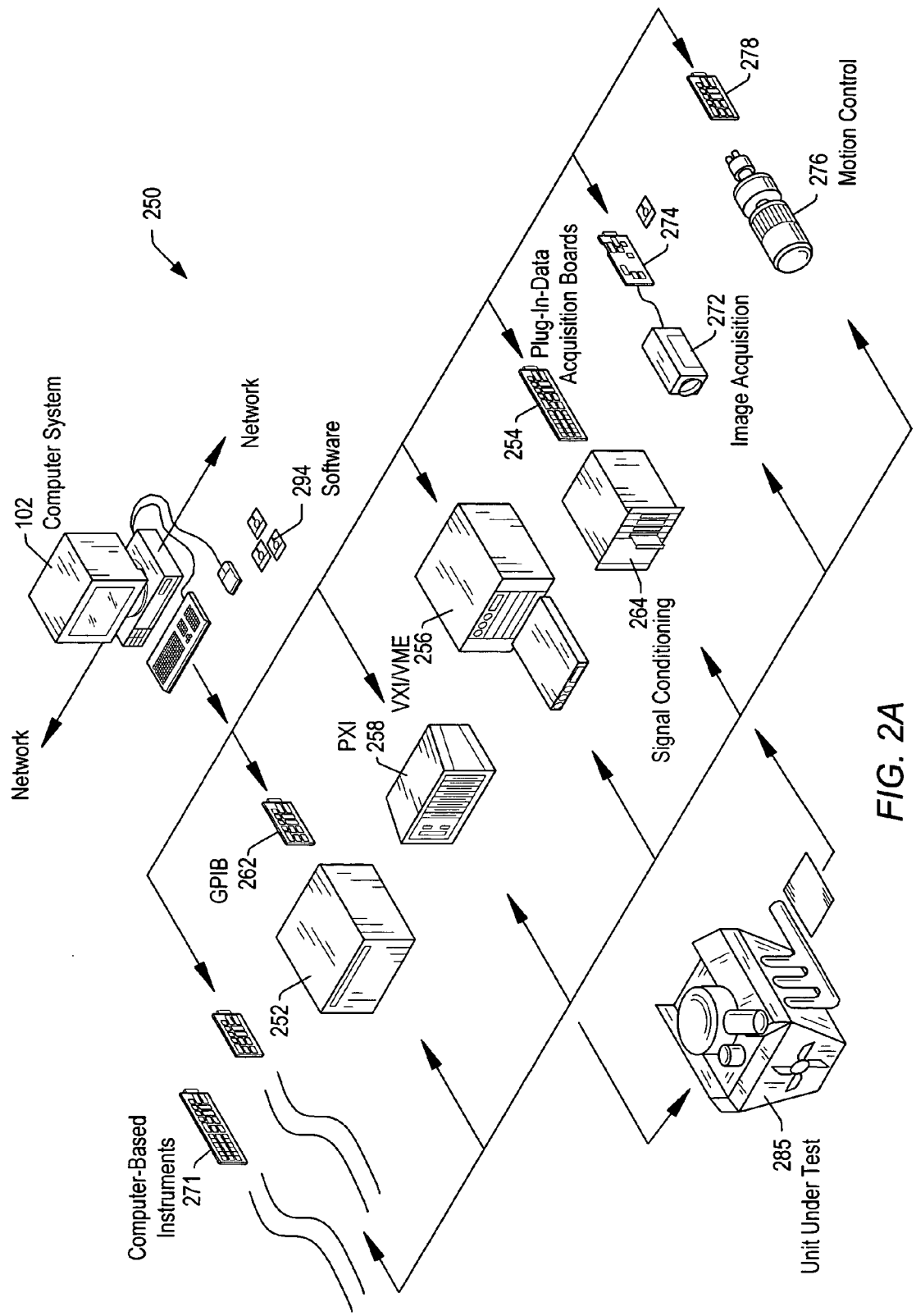
FIG. 2A illustrates an exemplary instrumentation control system which may implement embodiments of the invention.

FIG. 2A illustrates an exemplary instrumentation control system 250 which may implement embodiments of the invention. Components that correspond to those shown in FIG. 1 are numbered identically for simplicity and clarity. The system 250 comprises a host computer 102 which connects to one or more instruments. The host computer 102 may comprise a CPU, a display screen, memory, and one or more input devices such as a mouse or keyboard as shown, and the host computer 102 may be part of a network, such as a Local Area Network (LAN), a Wide Area Network (WAN), etc. The computer system 102 may operate with the one or more instruments to analyze, measure or control a UUT or process 285. The computer system 102 may also comprise a memory medium(s) on which one or more software programs and/or software components (e.g., software 294) according to one embodiment of the present invention may be stored. The memory medium may also store operating system software, as well as other software for operation of the computer system. Various embodiments further include receiving or storing instructions and/or data implemented in accordance with the foregoing description upon a carrier medium.

The one or more instruments may include a GPIB (General Purpose Interface Bus) instrument 252 and associated GPIB interface card 262, a data acquisition board 254 and associated signal conditioning circuitry 264, a VXI instrument 256, a PXI instrument 258, a video device or camera 272 and associated image acquisition (or machine vision) card 274, a motion control device 276 and associated motion control interface card 278, and/or one or more computer based instrument cards 271, among other types of devices. The computer system may couple to and operate with one or more of these instruments. In one embodiment, these instruments are remote systems, and may be representative of remote system 110 of FIG. 1. The instruments may be coupled to a unit under test (UUT) or process 285, or may be coupled to receive field signals, typically generated by transducers. The system 250 may be used in a data acquisition and control application, in a test and measurement application, an image processing or machine vision application, a process control application, a man-machine interface application, a simulation application, or a hardware-in-the-loop validation application, among others.

Figure 2B:
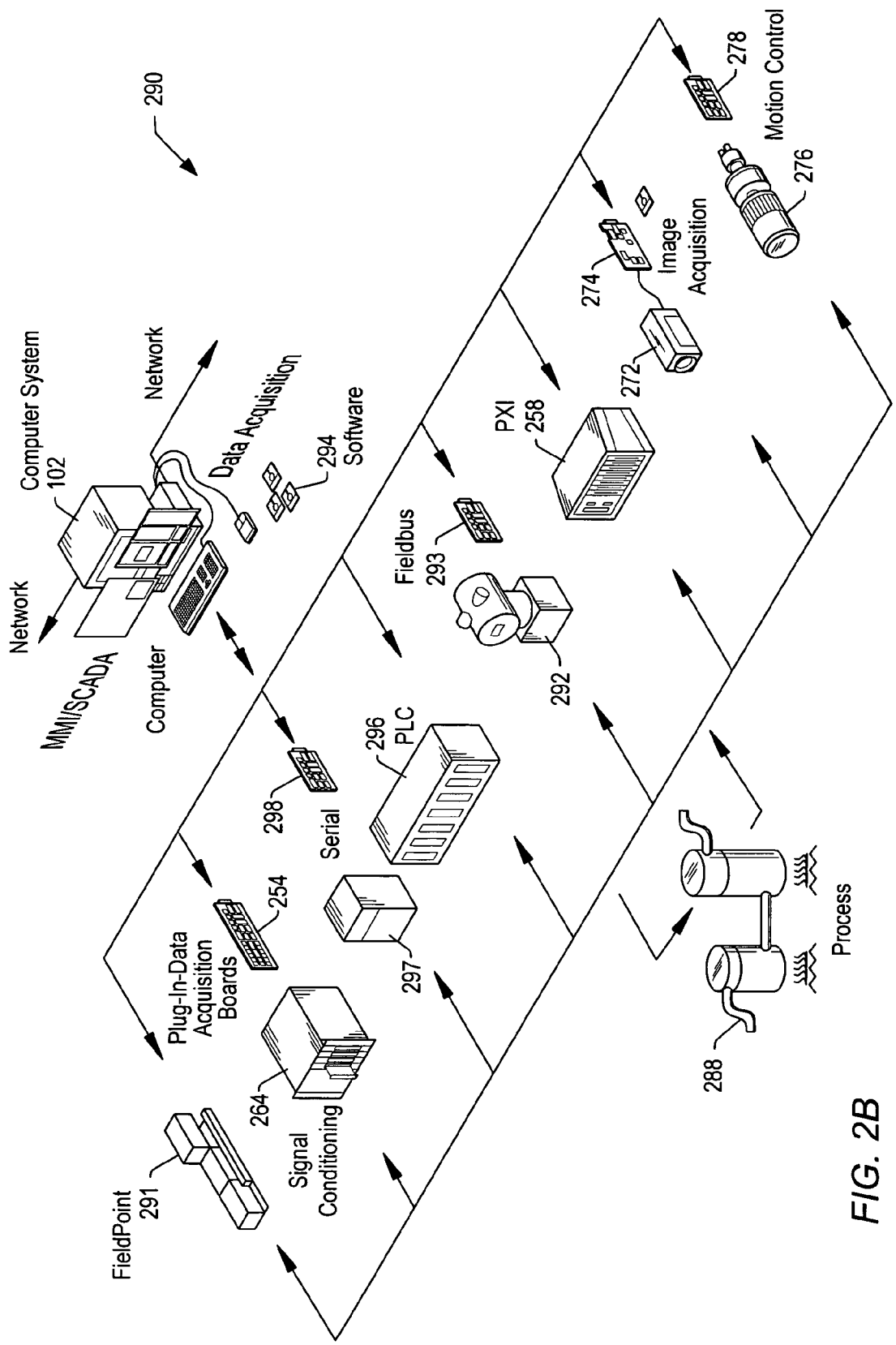
FIG. 2B illustrates an exemplary industrial automation system which may implement embodiments of the invention.

FIG. 2B illustrates an exemplary industrial automation system 290 which may implement embodiments of the invention. The industrial automation system 290 is similar to the instrumentation or test and measurement system 250 shown in FIG. 2A. Elements which are similar or identical to elements in FIG. 2A have the same reference numerals for convenience. The system 290 may comprise a computer 102 which connects to one or more devices (e.g., measurement devices) or instruments. The computer 102 may comprise a CPU, a display screen, memory, and one or more input devices such as a mouse or keyboard as shown. The computer 102 may operate with the one or more devices to a process or device 288 to perform an automation function, such as MMI (Man Machine Interface), SCADA (Supervisory Control and Data Acquisition), portable or distributed data acquisition, process control, advanced analysis, or other control, among others. In one embodiment, these devices are remote systems, and may be representative of remote system 110 of FIG. 1.

The one or more devices may include a data acquisition board 254 and associated signal conditioning circuitry 264, a PXI instrument 258, a video device 272 and associated image acquisition card 274, a motion control device 276 and associated motion control interface card 278, a fieldbus device 292 and associated fieldbus interface card 293, a PLC (Programmable Logic Controller) 296, a serial instrument 297 and associated serial interface card 298, or a distributed data acquisition system, such as the Fieldpoint system 291 available from National Instruments, among other types of devices.

Networked Computer Systems

Figure 3:
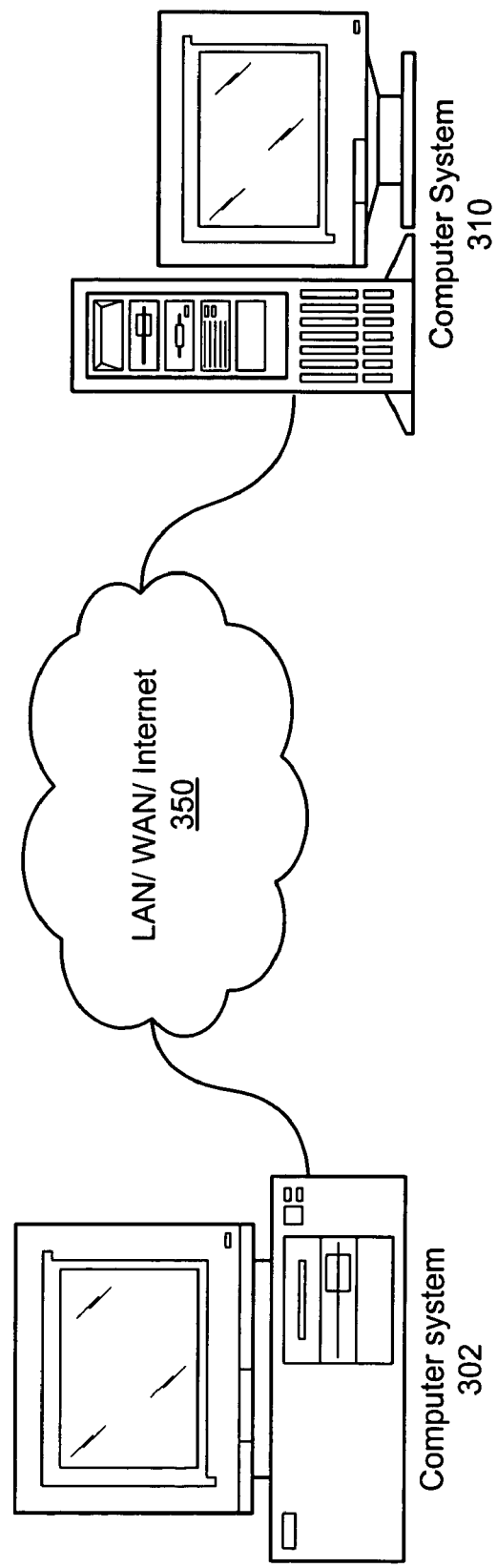
FIG. 3 is a diagram of an embodiment of a system for implementing the protocol for detecting and correcting transmission errors in packet-based communications.

FIG. 3 is a diagram illustrating one embodiment of a system 300, which may be suitable for implementing the protocol for efficiently detecting and correcting transmission errors in packet-based communications by using cumulative error detection codes. It is noted that the protocol will be described in detail below with reference to FIG. 4-7. The system 300 may include a first computer system 302 that is coupled to a second computer system 310 via a network 350. As described above, the computer systems 302 and 310 may each be any of various types, as desired. The network 350 may also be any of various types, including a LAN (local area network), WAN (wide area network), the Internet, or an Intranet, among others. Furthermore, the computer systems 302 and 310 may connect to the network 350 via a wired or wireless medium and may communicate with one another and with other systems and devices in the network 350 using a packet-based communication protocol. It should be noted that these embodiments are illustrative and are not intended to limit the invention to any particular configuration or application domain.

One Embodiment of the System

FIG. 4 is a block diagram illustrating one embodiment of a system 400 for implementing the protocol for efficiently detecting and correcting transmission errors in packet-based communications via a first communication module 440 and a second communication module 450. It is noted that system 400 may be one embodiment of systems 100, 250, 290, 300 described above. The system 400 may comprise a first device 402 including a first bus 412 and a second device 410 including a second bus 414. As described above, the devices 402 and 410 may each be any of various types, as desired, e.g., computer systems, Internet appliances, etc. In one embodiment, the first bus 412 may be a PCI (Peripheral Component Interconnect) bus and the second bus 414 may be a PXI (PCI extensions for Instrumentation) bus, although other bus types may be used. The first device 402 may comprise the first communication module 440, which is coupled to the first bus 412. Also, the second device 410 may comprise the second communication module 450, which is coupled to the second bus 414. In one embodiment, the first communication module 440 may be a PCI module and the second communication module 450 may be a PXI module, although other types of modules may be used. The first communication module 440 may be coupled to the second communication module 450 via a system interconnect 404 (e.g., a serial link, a network, etc.). The first communication module 440 of the first device 402 may communication with the second communication module 450 of the second device 410 using a packet-based communication protocol, including the protocol for efficiently detecting and correcting transmission errors in packet-based communications by using cumulative error detection codes, as described below with reference to FIG. 6-7. It should be noted that this embodiment is illustrative and is not intended to limit the invention to any particular configuration or application domain.

The first communication module 440 may comprise a transceiver 430A, a code generation unit 420A, and an error detection unit 410A. Similarly, the second communication module 450 may comprise a transceiver 430B, a code generation unit 420B, and an error detection unit 410B. The transceivers 430 may be configured to transmit and receive data packets via the system interconnect 404. In one embodiment, each of the transmitted packets may be subdivided into a plurality of transmission subunits, as described below with reference to FIGS. 5A-5B. For example, a 640-bit packet may comprise four 160-bit transmission subunits, although other sub-division schemes are also contemplated. The code generation units 420 may be configured to generate a cumulative error detection code for each of the transmission subunits. For example, the code generation units 420 may generate a cyclic redundancy check (CRC) code or a checksum. The error detection units 410 may be configured to detect transmission errors in the packet-based communications between first device 402 and second device 410 using the generated codes. The code generation units and the error detection units may be used to implement the protocol for detecting and correcting transmission errors in packet-based communications, as will be described below with reference to FIG. 6-7.

It should be noted that the components described with reference to FIG. 4 are meant to be exemplary only, and are not intended to limit the invention to any specific set of components or configurations. For example, in various embodiments, one or more of the components described may be omitted, combined, modified, or additional components included, as desired.

Transmission Subunits

Figure 5A:
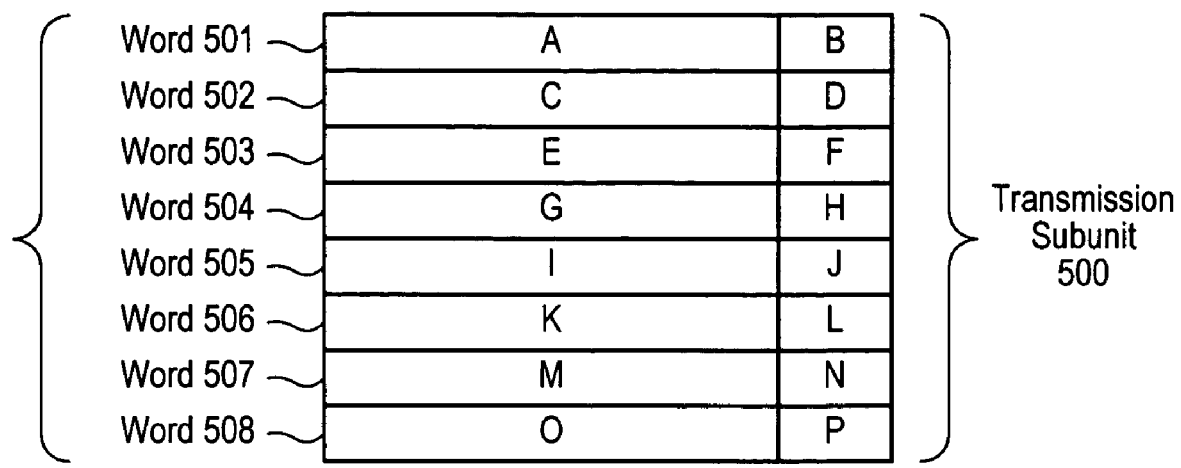
FIG. 5A is an illustration of one embodiment of a transmission subunit of a particular packet.

As described above, each transmitted packet includes a plurality of transmission subunits, where, in one embodiment, each transmission subunit may be 160 bits wide. However, it is noted that in other embodiments, each transmission subunit may be any size, as desired. Also, it is noted that in other embodiments, the transmission subunits may vary in size. In one embodiment, the system interconnect 404 of system 100 is a 20-bit bus. In this embodiment, each transmission subunit (i.e., 160 bits) is a group of 8 20-bit words, of which 16 bits are used for storing the data and 4 bits for storing the cumulative error detection code (e.g., cumulative CRC code). Therefore, each transmission subunit includes 128 bits of data and 32 bits of error detection code. It is noted however that in other embodiments the 20-bit words may comprise any size combination of data and error detection code, as desired. For example, in one embodiment, a transmission subunit may comprise seven 20-bit words of only data and one 20-bit word of only error detection. Also, it is noted that in other embodiments a bus of any size may be used, for example, a 32-bit bus may be included in system 100. FIG. 5A illustrates one embodiment of a transmission subunit 500 of a particular packet, which comprises words 501-508. As shown, word 501 includes segments A and B, word 502 includes segments C and D, word 503 includes segments E and F, word 504 includes segments G and H, word 505 includes segments I and J, word 506 includes segments K and L, word 507 includes segments M and N, and word 508 includes segments O and P.

Figure 5B:
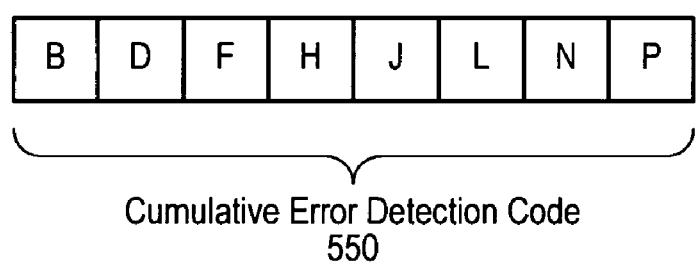
FIG. 5B is an illustration of one embodiment of cumulative error detection code extracted from the transmission subunit of FIG. 5A.

In one embodiment, segments B, D, F, H, J, L, N, and P are the 4-bit portions of the 32-bit cumulative error detection code corresponding to the transmission subunit 500 of the packet. For example, segment B is the 4-bit cumulative error detection code associated with the 16-bit segment A, and segment H is the 4-bit cumulative error detection code associated with the 16-bit segment G. When the transmission subunit 500 is received and stored by, for example, the second device 410, the 32-bit cumulative error detection code 550 may be extracted from the transmission subunit 500, as shown in FIG. 5B. The 32-bit cumulative error detection code 550 may be used to error check the 128-bit data portion of transmission subunit 500 comprised in segments A, C, E, G, I, K, M, and O as well as the data of previously transmitted transmission subunits of the packet, as will be described below.

In one embodiment, segments A and C of words 501 and 502 may include the header for the respective packet that includes transmission subunit 500. As suggested above, a packet typically includes a header, which may be stored in one or more of the plurality of transmission subunits corresponding to the packet. For example, the header may be included in the first segments of the first transmission subunit of the packet. In another example, the header may be included in the first and second transmission subunits of the packet. The header usually includes information about the packet. For example, the header may be used to indicate that a new packet has been sent, to determine if a packet has been dropped and needs to be retransmitted, and to eventually decode the data contained within the packet. In one embodiment, the header (e.g., segments A and C of words 501 and 502) of a particular packet may include a Global Transmission Count (GTC) to provide information used to determine whether a transmission error occurred in the previous packet. The GTC may be a value corresponding to the incremental size of the data (i.e., the total size of the transmission subunits including headers and pad data) transmitted up to a particular point in time.

In this example, segments E, G, I, and K of words 503-506 may include the data to be transmitted in the transmission subunit 500. Segments M and O of words 507 and 508 may include pad data. Pad data refers to data stored at the end of a transmission subunit when there is not enough data in the packet to fill the subunit, e.g., a 160-bit transmission subunit. It is noted however that in other embodiments any segment of a transmission subunit may comprise the header, the data, and/or pad data. It is also noted that some transmission subunits may not include headers and/or pad data. For example, if a previous transmission subunit of a packet transmitted the header corresponding to the packet, a subsequent transmission subunit of the packet (e.g., transmission subunit 500) may only comprise the data and the error detection code.

In some embodiments, one or more of the transmitted packets may be Global Transmission Count (GTC) packets (e.g., "heartbeat" packets). In one embodiment, first communication module 440 may transmit a GTC packet to the second communication module 450 when the first communication module 440 is idle. In one embodiment, a GTC packet comprises only the GTC value; no data is transmitted via the GTC packet. More specifically, a GTC packet may be a null packet including only the GTC value.

Error Detection and Correction Protocol

Figure 6:
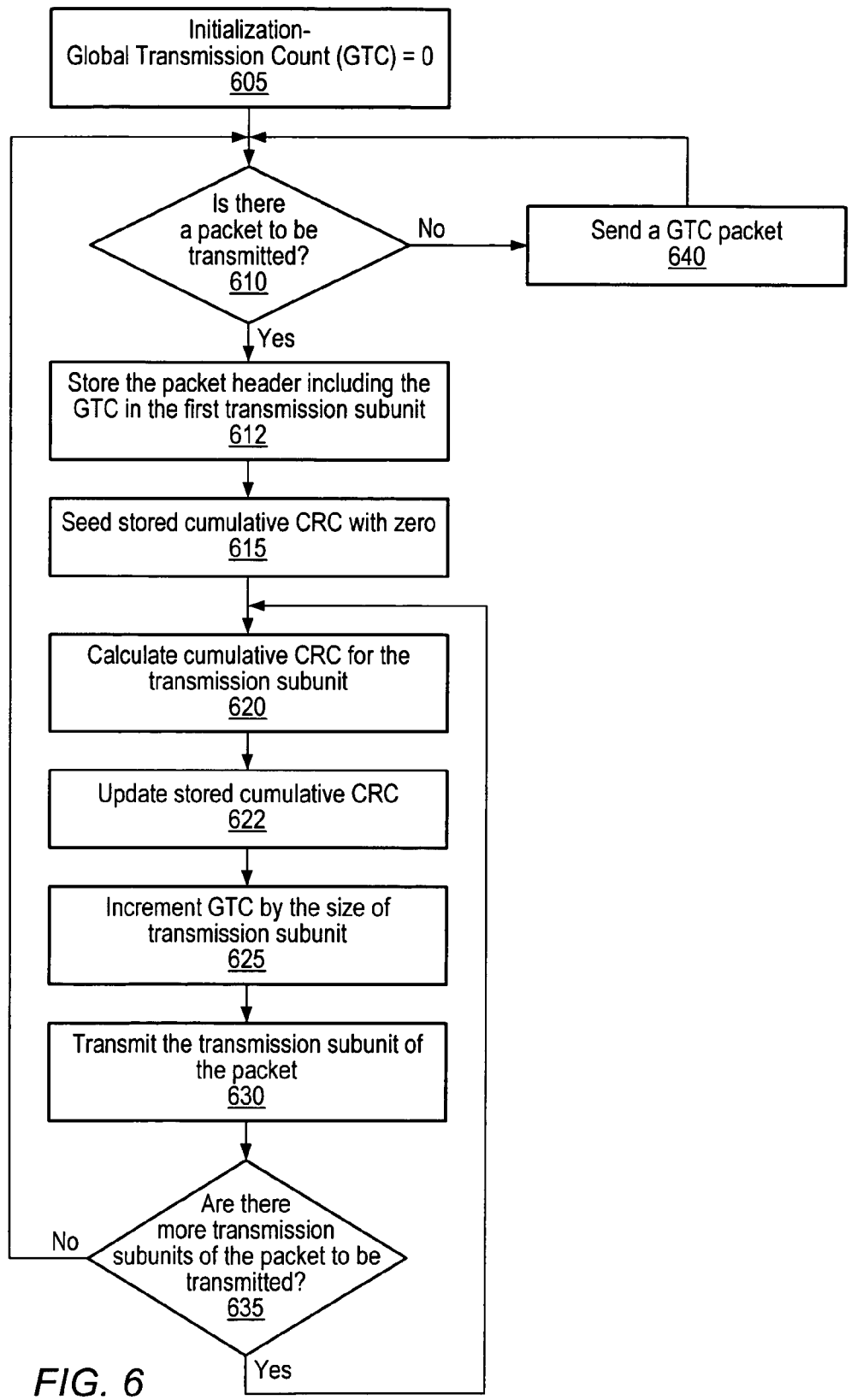
FIG. 6 is a flow diagram illustrating a method for transmitting packets that implements the protocol for detecting and correcting transmission errors in packet-based communications, according to one embodiment.

Turning now to FIG. 6, a flow diagram is shown illustrating one embodiment of a method for transmitting packets which implements an embodiment of the protocol for efficiently detecting and correcting transmission errors in packet-based communications by using cumulative error detection code. It should be noted that in various embodiments, some of the steps shown may be performed concurrently, in a different order than shown, or omitted. Additional steps may also be performed as desired.

Referring collectively to FIGS. 4-6, as indicated in block 605 of FIG. 6, a transmitting unit (e.g., the first communication module 440 of FIG. 4) may be initialized and a Global Transmission Count (GTC) set to zero. For example, the value zero may be stored in a GTC register that holds the GTC value. The transmitting unit is preferably configured to transmit one or more data packets, and each of the packets may be subdivided into a plurality of transmission subunits (e.g., see transmission subunit 500 of FIG. 5). In one embodiment, as shown in FIG. 4 with reference to the first communication module 440, the transmitting unit comprises a transceiver configured to transmit and receive packets.

In block 610, the transmitting unit may determine whether there is a packet available to be transmitted. In one embodiment, if a packet is available, the packet header including the GTC may be stored in the first one or more words of the first transmission subunit of the packet, as indicated in block 612. For example, with reference to the example of FIG. 5, the packet header may be included in segments A and C of transmission subunit 500. It is noted that in other embodiments the header may be included in one or more of the plurality of transmission subunits of a particular packet. If this is the first packet to be transmitted after initialization, the GTC that is included in the packet header of the first transmission subunit will be equal to zero. However, if this is not the first packet after initialization, the GTC will preferably be equal to the total or incremental size of all the data comprised in all the packets that have been transmitted since the previous initialization.

Also, if a packet is available, a stored cumulative error detection code (e.g., the stored cumulative CRC code) may be set to zero, as indicated in block 615. For example, a CRC register may comprise the stored cumulative CRC code. Therefore, in this example, the value zero may be stored in the CRC register. The stored cumulative CRC code may be used to generate the cumulative CRC code for each of the transmission subunits of a packet. In one embodiment, the CRC code is cumulative across the transmission subunits of the packet. Therefore, the stored cumulative CRC code is set to zero before calculating the cumulative CRC code for a first transmission subunit of a new packet.

In block 620, the cumulative CRC code for a transmission subunit of the packet may be generated based on the data comprised in the transmission subunit and a cumulative CRC corresponding to zero or more previously transmitted transmission subunits of the packet. More specifically, the cumulative CRC corresponding to zero or more previously transmitted transmission subunits of the packet may be a previously generated cumulative error detection code corresponding to an immediate previously transmitted transmission subunits of the packet. In one embodiment, the previously generated cumulative error detection code corresponding to the immediate previously transmitted transmission subunits of the packet may be the stored cumulative CRC code. Thus, each of the transmission subunits of the packet may comprise the data associated with the transmission subunit and the generated cumulative error detection code associated with the data and the stored cumulative CRC code. As noted above, in other embodiments other types of error detection codes may be used instead of the cumulative CRC code, for example, cumulative checksums.

In one embodiment, the transmitting unit comprises a code generation unit (e.g., the code generation unit 420A of FIG. 4) for generating the cumulative CRC code. For example, with respect to a current transmission subunit of the packet, the code generation unit may be configured to read the data comprised in the current transmission subunit and the stored cumulative CRC code. As described above, the stored cumulative CRC code may be the cumulative CRC code of the previously transmitted transmission subunit of the packet, or it may have a value of zero if this is the first transmission subunit of the packet. After performing the read operation, the code generation unit generates the cumulative CRC code for the current transmission subunit based on the data comprised in the current transmission subunit and the stored cumulative CRC code. For example, the cumulative CRC for transmission subunit 500 of FIG. 5 may comprise segments B, D, F, H, J, L, N, and P, which may be generated based on the data included in segments A, C, E, G, I, K, M, and O (i.e., the data comprised in transmission subunit 500) and the stored cumulative CRC code. Therefore, the data comprised in a transmission subunit, used to calculate the cumulative CRC code, may include the header information, the actual data to be transmitted, and/or pad data of the transmission subunit. In one embodiment, the code generation unit uses the CRC polynomial 0x04C11DB7 (represented in hexadecimal format) to generate the cumulative CRC code, which is also known as "CRC-32." However, it is noted that in other embodiments the code generation may use any polynomial to generate the cumulative error detection code.

In one example, with regard to the first transmission subunit of the packet, the stored cumulative CRC code is zero. Therefore, the cumulative CRC code for the first transmission subunit of the packet is generated based on the data comprised in the first transmission subunit and the value zero. In another example, with regard to the second transmission subunit of the packet, the stored cumulative CRC code is the cumulative CRC code of the first transmission subunit. Thus, the cumulative CRC code for the second transmission subunit of the packet is generated based on the data comprised in the second transmission subunit and the previously generated cumulative CRC code of the first transmission subunit (i.e., the stored cumulative CRC code). In yet another example, with regard to the third transmission subunit of the packet, the stored cumulative CRC code is the cumulative CRC code of the second transmission subunit. Therefore, the cumulative CRC code for the third transmission subunit of the packet is generated based on the data comprised in the third transmission subunit and the cumulative CRC code of the second transmission subunit, and so forth.

As described above, the cumulative CRC code of a particular transmission subunit of a packet is cumulative because it depends on the cumulative CRC code of the previously transmitted transmission subunits of the packet. The cumulative CRC code is preferably cumulative across the transmission subunits of each packet and so the cumulative CRC is calculated individually for each packet. Thus, when a new packet is to be transmitted, the stored cumulative CRC code is set to zero. In an alternative embodiment, the cumulative CRC code may be cumulative across the transmission subunits of two or more packets.

In block 622, when the cumulative CRC code for the current transmission subunit of the packet is generated, the stored cumulative CRC is updated with the generated cumulative CRC code of the transmission subunit. For example, with reference to transmission subunit 500 of FIGS. 5A-5B, the stored cumulative CRC may be updated with the generated cumulative CRC code included in segments B, D, F, H, J, L, N, and P, as shown in FIG. 5B.

Additionally, after the cumulative CRC code for the current transmission subunit of the packet is generated, the GTC may be incremented by the total size of the transmission subunit, as indicated in block 625. For example, the total size of the example transmission subunit 500 is the cumulative size of words 501-508. In one embodiment, if each of the words 501-508 are 20 bits wide, then the total size of the transmission subunit 500 is 160 bits. Therefore, in this example, the GTC is incremented by 160.

In block 630, the current transmission subunit of the packet, which includes the generated cumulative CRC code, is transmitted. As described above, in one embodiment, the transmission subunit (e.g., transmission subunit 500) is transmitted by the transceiver of the transmitting unit (e.g., the transceiver 430A of the first communication module 440) and received by the transceiver of a receiving unit (e.g., the transceiver 430B of the second communication module 450), as will be described below with reference to FIG. 7.

In block 635, the transmitting unit may determine whether there is another transmission subunit of the packet available to be transmitted. If another transmission subunit is available, the cumulative CRC code for the another transmission subunit may be calculated, as indicated in block 620. However, if another transmission subunit is not available, then the transmitting unit may determine whether there is a new packet available to be transmitted, as indicated in block 610. If a new packet is available to be transmitted, then the process described above may be repeated. However, if a new packet is not available, a GTC packet may be transmitted, as indicated by block 640.

As described above, in one embodiment, a GTC packet is a null packet including only the current GTC value, which may be transmitted when the transmitting unit is idle. In one embodiment, the GTC packet may be sent when the transmitting unit is idle for a predetermined period of time. In another embodiment, the GTC packet may be sent as soon as the transmitting unit enters an idle state. In one embodiment, the GTC packet is sent periodically if the transmitting unit remains in the idle state.

In one embodiment, the transmitting unit may be configured to transmit open-ended packets. Open-ended packets are packets that are transmitted without storing size information with respect to the current packet in the header or body of the current packet. Therefore, when the receiving unit receives a header associated with an open-ended packet, the receiving unit has no indication as to the size of the packet to be received. As described below, indications detected by the receiving unit to determine that it has received the current packet and has begun receiving a new packet may include the reception of a header of a new packet or a GTC packet. Open-ended packets may include smaller headers than other types of packets because the size information is not included in the headers. Also, as described below, the receiving unit may consume open-ended packets quickly without much accumulation. Therefore, transmitting open-ended packets may be considered a throughput optimization, which helps alleviate some of the latency issues associated with packet-based communications. It is noted however that in some embodiments other types of packets other than open-ended packets may be transmitted.

Figure 7:
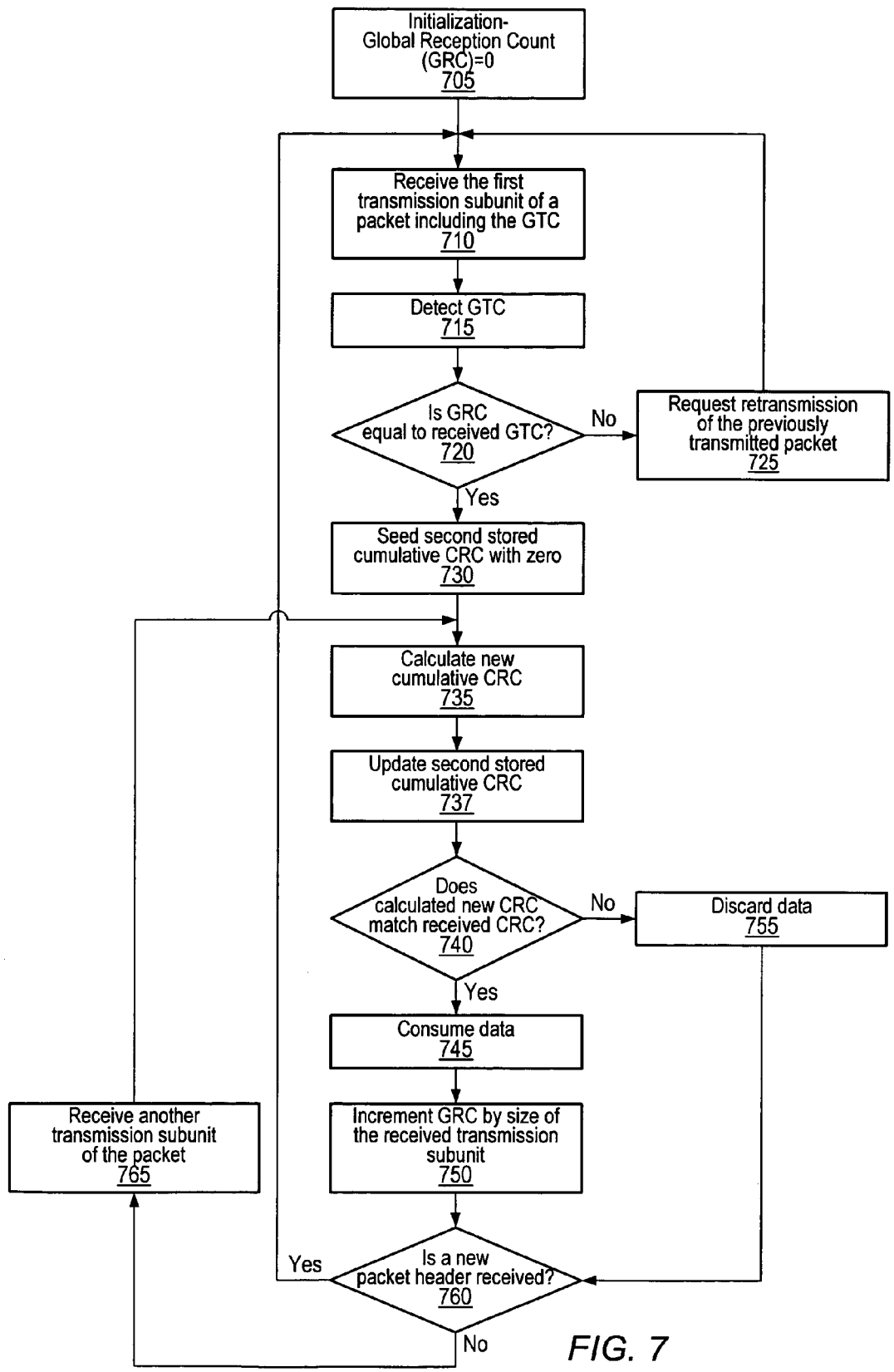
FIG. 7 is a flow diagram illustrating a method for receiving packets that implements the protocol for detecting and correcting transmission errors in packet-based communications, according to one embodiment.

FIG. 7 is a flow diagram illustrating one embodiment of a method for receiving packets, which implements an embodiment of the protocol for efficiently detecting and correcting transmission errors in packet-based communications by using cumulative error detection codes. It should be noted that in various embodiments, some of the steps shown may be performed concurrently, in a different order than shown, or omitted. Additional steps may also be performed as desired.

Referring collectively to FIGS. 4-7, in one embodiment, when the transmitting unit (e.g., the first communication module 440 of FIG. 4) is initialized, the corresponding receiving unit (e.g., the second communication module 450) is also initialized and a Global Reception Count (GRC) is set to zero, as indicated in block 705. For example, the value zero may be stored in a GRC register that holds the GRC value. The GRC may be a value corresponding to the total or incremental size of all the data comprised in all the packets that have been received by the receiving unit since the previous initialization. As described below, the GRC may be used along with the GTC to determine whether a transmission error occurred in the transmission of a packet.

The receiving unit is preferably configured to receive one or more packets, which may each be subdivided into a plurality of transmission subunits. For example, the receiving unit may be configured to receive the one or more packets transmitted by the transmitting unit, which may be subdivided into a plurality of transmission subunits similar to the transmission subunit 500 of FIG. 5. In one embodiment, as shown in FIG. 4 with reference to the second communication module 450, the receiving unit comprises a transceiver. In this embodiment, the receiving unit is configured to receive and transmit packets.

In block 710, the receiving unit may receive the first transmission subunit of a packet including at least a portion of the packet header. As described above, the packet header may be included in the first one or more transmission subunits of the packet. Also, the GTC may be included in the first one or more words of the first transmission subunit of the packet. Therefore, as soon as the receiving unit receives the first one or more words of the first transmission subunit, the receiving unit may detect the GTC, as indicated in block 715. It is noted however that the GTC may be included in any of the words of the first transmission subunit of the packet. It is noted however that in other embodiments the GTC may be included in any of the transmission subunits of the packet.

Additionally, the GRC may be compared to the received GTC to determine if they are equal, as shown in block 720. The received GRC will match the GTC if no transmission errors occurred in the transmission of the previous packet. As described previously, if this is the first packet to be transmitted after initialization, the GTC will be equal to zero. If this is not the first packet after initialization, the GTC will be equal to the total or incremental size of all the data that has been transmitted since the previous initialization. It is noted that the GTC included in the header of a particular packet preferably includes the count of the total size of all the data, including headers and pad data, which has been transmitted up to and including the previous packet. Therefore, the GTC preferably does not include the size of the packet being transmitted. This is consistent with the GRC because, when the GTC is received, the GRC includes the count of all the data that has been received up to and including the previous packet. It is noted however that in other embodiments the GTC and GRC may comprise counts that include the size of the data of the current packet.

In block 725, if the GRC is less than the received GTC, the receiving unit may request a retransmission of the previously transmitted packet. For example, if two 640-bit packets (i.e. a first and a second transmitted packet) have been transmitted since the last initialization, then the GTC included in the third transmitted packet is equal to 1280 (i.e., 2×640). In this example, if one 160-bit transmission subunit of the second transmitted packet were lost, then the GRC of the receiving unit would be equal to 1120. Therefore, in this example, the GRC is less than the received GTC and so the receiving unit requests a retransmission of the second transmitted packet. It is noted that in this example the third transmitted packet is retransmitted after the second transmitted packet is retransmitted. In another example, if the GRC is greater than the received GTC, the receiving unit may ignore one or more transmission subunits of the retransmitted packet until the counts are equal, as described below.

In one embodiment, after a request for a retransmission is sent, the complete packet may be retransmitted, even if only one of the transmission subunits were lost in the original transmission. The retransmission request may include a retransmission point, which is the GTC value associated with the packet to be retransmitted. The transmitting unit determines the packet to retransmit based on the retransmission point (e.g., GTC value). For example, in one embodiment, the transmitting unit may store recently transmitted packets in a buffer. In this embodiment, the transmitting unit may distinguish between the stored packets based on the GTC value associated with each of the stored packets. In another embodiment, the receiving unit sends an acknowledge signal to the transmitting unit for each packet that it successfully receives. In this embodiment, the transmitting unit may store the packets that have not been acknowledged by the receiving unit in the buffer. It is noted however that in other embodiments the transmitting unit may determine which packet to retransmit by other methods. Additionally, in one embodiment, the receiving unit may send a retransmission request periodically until the requested packet is received to avoid deadlock and problems that may arise from damaged retransmission requests. It is noted however that in other embodiments the transmitting unit only retransmits the lost transmission subunits of the packet.

In block 730, if the GRC is equal to the received GTC, a second stored cumulative error detection code (e.g., the second stored cumulative CRC code) is set to zero. For example, a second CRC register may comprise the second stored cumulative CRC code. Therefore, in this example, the value zero may be stored in the second CRC register. The second stored cumulative CRC code may be used to generate a new cumulative CRC code for a received transmission subunit. As described below, the receiving unit may generate the new cumulative CRC code to be used as a check, i.e., to determine whether an error occurred in the transmission of the received transmission subunit. In one embodiment, the new cumulative CRC code is cumulative across the received transmission subunits of a packet. Therefore, the second stored cumulative CRC code is set to zero before calculating the new cumulative CRC code for a first received transmission subunit of a new packet.

In block 735, the new cumulative CRC code may be generated for the received transmission subunit of a packet. As described above, the received transmission subunit comprises the data comprised in the transmission subunit and the cumulative CRC code associated with the data (i.e., the received CRC code). The new cumulative CRC code for the received transmission subunit is generated based on the data comprised in the received transmission subunit and a new cumulative error detection code corresponding to zero or more previously received transmission subunits of the packet. More specifically, the new cumulative error detection code corresponding to zero or more previously received transmission subunits of the packet may be a previously generated new cumulative error detection code corresponding to an immediate previously received transmission subunits of the packet. In one embodiment, the previously generated new cumulative error detection code corresponding to the immediate previously received transmission subunits of the packet may be the second stored cumulative CRC code. Thus, in one embodiment, the new cumulative CRC code for the received transmission subunit is generated based on the data comprised in the received transmission subunit and the second stored cumulative CRC code. As noted above, in other embodiments other types of error detection code may be used instead of the cumulative CRC code, for example, cumulative checksums.

In one embodiment, the receiving unit comprises a code generation unit (e.g., the code generation unit 420B of FIG. 4) for generating new cumulative CRC codes. For example, with respect to a received transmission subunit of the packet, the code generation unit may be configured to read the data comprised in the received transmission subunit and read the second stored cumulative CRC code. As described above, the second stored cumulative CRC code may be the previously generated new cumulative CRC code of the immediate previously received transmission subunit of the packet, or it may be the value zero if this is the first received transmission subunit of the packet. After performing the read operation, the code generation unit generates the new cumulative CRC code for the received transmission subunit based on the data comprised in the received transmission subunit and the second stored cumulative CRC code.

As described above, the new cumulative CRC code of a particular received transmission subunit of a packet is cumulative because it depends on the previously generated new cumulative CRC code of the previously received transmission subunits of the packet (i.e., the second stored cumulative CRC code). The new cumulative CRC code is preferably cumulative across the received transmission subunits of each packet and so the new cumulative CRC is preferably calculated individually for each received packet. Thus, when a new packet is received, the second stored cumulative CRC code is set to zero. In an alternative embodiment, the new cumulative CRC code may be cumulative across the received transmission subunits of two or more packets.

When the new cumulative CRC code for the received transmission subunit of the packet is generated, the second stored cumulative CRC code may be updated with the generated new cumulative CRC code of the received transmission subunit, as indicated in block 737. For example, if this is the first received transmission subunit of the packet, then the value zero (i.e., the second stored cumulative CRC code) may be replaced with the generated new cumulative CRC code of the first received transmission subunit of the packet. In this example, when the new cumulative CRC code for a second received transmission subunit of the packet is generated, the second stored cumulative CRC code is updated with the generated new cumulative CRC code of the second received transmission subunit of the packet, and so forth.

In block 740, an error detection unit comprised in the receiving unit (e.g., the error detection unit 410B comprised in the second communication module 450 of FIG. 4) may determine whether the generated new CRC code matches the received CRC code. In one embodiment, the generated new CRC code matches the received CRC code if no errors have occurred in the transmission of the received transmission subunits of the packet. However, if the generated new CRC code does not match the received CRC code, then it may indicate that the received transmission subunit was corrupted or data was lost in the transmission.

If the new CRC code generated by the code generation unit of the receiving unit matches the received CRC code, the receiving unit preferably consumes the data comprised in the received transmission subunit, with the exception of pad data, as indicated in block 745. It is noted that consuming the data may involve further storing the data, sending the data to a PCI device, and/or using the data for the purpose for which it was transmitted. It is also noted that by consuming the data comprised in each received transmission subunit that is transmitted successfully (with the exception of pad data), all the data of the corresponding packet does not have to be accumulated at the receiving unit; therefore, the latency associated with the transmission of packetized data may be reduced. Thus, the receiving unit only accumulates or temporarily stores the data comprised in each received transmission subunit until the receiving unit determines whether to consume or discard the data.

After the receiving unit consumes the data comprised in the received transmission subunit, the GRC is incremented by the total size of the received transmission subunit, as indicated in block 750. For example, if the total size of the received transmission subunit is 160 bits, then the GRC is incremented by 160.

In block 755, if the new CRC code generated by the code generation unit of the receiving unit does not match the received CRC code, the receiving unit may discard the data comprised in the received transmission subunit. It is noted that discarding the data may involve erasing the data from the location where the received transmitted subunit is accumulated. It is also noted that by discarding the data comprised in each received transmission subunit that is transmitted unsuccessfully, all the data of the corresponding packet does not have to be accumulated or temporarily stored at the receiving unit, as mentioned above.

In block 760, the receiving unit may detect whether a new packet header has been received. If a new packet header has been received, the receiving unit may receive the first transmission subunit of a new packet, as indicated in block 710. However, if a new packet header has not been received, the receiving unit may receive another transmission subunit of the packet, as indicated in block 765.

In one embodiment, a request for retransmission is not sent to the transmitting unit if a received transmission subunit of a packet is discarded. Instead, the subsequently received transmission subunits of the packet are also discarded. For example, the packet may comprise four 160-bit transmission subunits. If the receiving unit discards the first received transmission subunit of the packet, it may also discard the other three received transmission subunits of the packet. The receiving unit may not send a request for retransmission until a new packet is received. The GRC of the receiving unit is not incremented when a received transmission subunit is discarded. Therefore, when a new packet is received, the receiving unit may request a retransmission because the GRC is not equal to the received GTC included in the received new packet, as described above. It is noted however that in other embodiments the receiving unit may request a retransmission of a packet when a received transmission subunit of the packet is discarded.

It is also noted that in other embodiments, when a first received transmission subunit is discarded, the receiving unit may not automatically discard the other three received transmission subunits. Instead, in these other embodiments, the receiving unit may generate the new cumulative CRC code and compare it to the received cumulative CRC code for each subsequently received transmission subunit, as described above. In these other embodiments, since the previously received transmission subunit of the packet was discarded, the cumulative CRC codes will not match (since the CRC is cumulative across all transmission subunits of the packet) and all the subsequently received transmission subunits of the packet will be discarded due to the CRC mismatch.

After a retransmission of a packet, the GRC may be greater than the received GTC. For example, the received packet may have included four 160-bit transmission subunits, and the first through the third received subunits may have been consumed by the receiving unit, but the fourth subunit may have been discarded because of a CRC mismatch. In this example, the GRC was incremented after each of the three transmission subunits were consumed. As described above, in this situation, the receiving unit may send a retransmission request to the transmitting unit, the complete packet (i.e., the four transmission subunits) may be retransmitted, and the GTC adjusted accordingly (i.e., reduced by the size of the four transmission subunits) to account for the retransmission. In this example, the GRC will be greater than the GTC included in the received retransmitted packet. More specifically, in this example, the GRC will be greater than the received GTC by the size of the three received transmission subunits that were consumed in the original transmission, as described above. Therefore, in one embodiment, when the GRC is greater than the received GTC, the receiving unit ignores or discards one or more of the retransmitted transmission subunits of the packet until the counts are equal. Then, the subsequent retransmitted transmission subunits, which were not previously consumed in the original transmission, are consumed and the GRC is incremented. In one embodiment, the receiving unit may comprise a monitoring mechanism or another counting mechanism to determine when the counts are equal.

As described above, one or more of the transmitted packets may be GTC packets. In one embodiment, the transmitting unit sends and the receiving unit receives a GTC packet when the transmitting unit is idle. A GTC packet preferably comprises only the GTC value; no data is transmitted via the GTC packet. More specifically, a GTC packet is preferably a null packet including only the GTC value. In one example, an open-ended packet is transmitted and each of the transmission subunits of the open-ended packet are consumed by the receiving unit. Then, the transmitting unit changes to an idle state. Since the receiving unit must determine whether there were any errors in the transmission of the open-ended packet, the transmitting unit sends a GTC packet having an updated GTC. When the receiving unit receives the GTC packet, the error detection unit compares the GRC value with the received GTC value. As described above, the receiving unit may request a retransmission of the previously received packet if the GRC is less than the received GTC. It is noted that in preferred embodiments, neither the GTC nor the GRC are incremented when GTC packets are sent or received. However, in alternative embodiments, the GTC and/or the GRC may be incremented when GTC packets are sent or received.

As described above, in one embodiment, the transmitting unit may be configured to transmit open-ended packets, i.e., open-ended packets are packets that are transmitted without storing size information with respect to the current packet in the header or body of the current packet. In one embodiment, since open-ended packets do not included the size information, the order of transmission of the packets and transmission subunits of a particular packet should match the order of reception of the transmitted packets and transmission subunits. More specifically, as described above, the protocol for detecting and correction transmission errors utilizes cumulative error detection codes. The order of the transmitted and received transmission subunits of a particular packet should match due to the cumulative nature of the error detection code. Similarly, the order of the transmitted and received packets should match to successfully implement the comparison between the GTC and the GRC of each transmitted packet, as described above. It is noted however that in alternative embodiments the order of transmission and reception of packets and/or transmission subunits may differ.

In one embodiment, the GTC, the GRC, the code generation units (e.g., code generation unit 420A) and/or the error detection units (e.g., error detection unit 410B) may be implemented in hardware. In a further embodiment, the GTC, the GRC, the code generation unit and/or the error detection unit may be implemented in software. In yet another embodiment, the GTC, the GRC, the code generation unit and/or the error detection unit may be implemented in both hardware and software. In one embodiment, the functionality described above with regard to the GTC, the GRC, the code generation unit and/or the error detection unit may be distributed across multiple components. In various embodiments, this type of functional distribution may also apply to other components described herein.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for transmitting packets, which is operable to implement a protocol for detecting and correcting transmission errors in packet-based communications, the apparatus comprising:
   a device configured to transmit one or more packets, wherein each packet comprises a header and a footer and is configured for transmission as a single entity, wherein each packet comprises a plurality of transmission subunits, and wherein each of the plurality of transmission subunits does not have a header and a footer; and
   a code generation unit coupled to the device and configured to generate a cumulative error detection code for each of the plurality of transmission subunits of a packet wherein the first error detection code is seeded with a value;
   wherein the cumulative error detection code for each transmission subunit of the packet is generated based on data comprised in the each transmission subunit and a previous cumulative error detection code corresponding to one or more previously transmitted transmission subunits of the packet.

2. The apparatus of claim 1, wherein the code generation unit is further configured to generate the cumulative error detection code for each of the plurality of transmission subunits of the packet with the exception of a first transmission subunit, wherein the cumulative error detection code is based on the data comprised in the transmission subunit and the previous cumulative error detection code corresponding to the one or more previously transmitted transmission subunit of the packet.

3. The apparatus of claim 1, wherein the code generation unit is configured to store the previous cumulative error detection code.

4. The apparatus of claim 1, wherein the code generation unit is configured to set the previous cumulative error detection code to zero before generating the cumulative error detection code for a first transmission subunit of the packet, wherein the cumulative error detection code for the first transmission subunit of the packet is generated based on the data comprised in the first transmission subunit and the value zero.

5. The apparatus of claim 4, wherein the code generation unit is configured to generate the cumulative error detection code for a second transmission subunit of the packet based on the data comprised in the second transmission subunit and the cumulative error detection code associated with the first transmission subunit of the packet.

6. The apparatus of claim 5, wherein the code generation unit is configured to generate the cumulative error detection code for a third transmission subunit of the packet based on the data comprised in the third transmission subunit and the cumulative error detection code associated with the second transmission subunit.

7. The apparatus of claim 1, wherein the device is further configured to transmit a header within each packet, wherein the header is comprised in one or more transmission subunits of each packet.

8. The apparatus of claim 7, wherein the header comprises a global transmission count (GTC), wherein the GTC is a total size of data transmitted by the device since a previous initialization, up to and including the one or more previously transmitted transmission subunits of a one or more previously transmitted packet.

9. The apparatus of claim 8, wherein the GTC is incremented by a value corresponding to a size of a transmitted subunit.

10. The apparatus of claim 8, wherein the device is configured to transmit a GTC packet during idle periods, wherein the GTC packet is a null packet including only the GTC.

11. The apparatus of claim 1, configured to transmit packets over a system interconnect to a second apparatus.

12. The apparatus of claim 1, wherein the cumulative error detection code is a cumulative cyclic redundant checking (CRC) code.

13. The apparatus of claim 1, wherein the cumulative error detection code is a cumulative checksum.

14. The apparatus of claim 1, wherein the device is also configured to receive data.

15. The apparatus of claim 1, wherein the device is configured as a transceiver.

16. An apparatus for receiving packets, which is operable to implement a protocol for detecting and correcting transmission errors in packet-based communications, the apparatus comprising:
a device configured to receive one or more packets, wherein each packet comprises a plurality of transmission subunits, wherein each packet comprises a header and a footer, wherein each of the received transmission subunits of a packet comprises data comprised in the received transmission subunit and a received cumulative error detection code, and wherein each of the received transmission subunits do not comprise a header and a footer;
a code generation unit coupled to the device and configured to generate a new cumulative error detection code for each of the received transmission subunits of the packet, wherein the new cumulative error detection code for each received transmission subunit of the packet is generated based on the received data comprised in the each received transmission subunit and a new cumulative error detection code corresponding to one or more previously received transmission subunits of the packet wherein the first error detection code is seeded with a value; and
an error detection unit coupled to the code generation unit and configured to compare the new cumulative error detection code to the received cumulative error detection code to determine if a transmission error occurred.

17. The apparatus of claim 16, wherein the apparatus is operable to consume the received data comprised in the received transmission subunit if the new cumulative error detection code matches the received cumulative error detection code.

18. The apparatus of claim 16, wherein the apparatus is operable to discard the received data comprised in the received transmission subunit if the new cumulative error detection code does not match the received cumulative error detection code.

19. The apparatus of claim 16, wherein the code generation unit is further configured to generate the new cumulative error detection code for each of the received transmission subunits of the packet with the exception of a first received transmission subunit, wherein the new cumulative error detection code is based on the received data comprised in the received transmission subunit and a previously generated new cumulative error detection code corresponding to the one or more previously received transmission subunits of the packet.

20. The apparatus of claim 16, wherein the code generation unit is configured to generate the new cumulative error detection code for each of the received transmission subunits of the packet based on the received data comprised in the received transmission subunit and a stored cumulative error detection code.

21. The apparatus of claim 16, wherein the device is further configured to receive a header within each of the received packets, wherein the header is comprised in one or more of the received transmission subunits of each received packet.

22. The apparatus of claim 21, wherein the device is configured to detect a global transmission count (GTC) in the received header, wherein the GTC is a total size of data transmitted since a previous initialization, up to and including the one or more previously transmitted transmission subunits of a one or more previously transmitted packet.

23. The apparatus of claim 22, wherein a global reception count (GRC) is compared with the received GTC, wherein the GRC is a total size of data received by the device since a previous initialization, up to and including the one or more previously received transmission subunits of a one or more previously received packet.

24. The apparatus of claim 23, wherein the device is operable to request a retransmission of a previously received packet if the GRC is less than the received GTC.

25. The apparatus of claim 23, wherein the device is operable to receive additional transmission subunits corresponding to a current packet associated with the received header if the GRC is equal to the received GTC.

26. The apparatus of claim 16, wherein the received cumulative error detection code and the new cumulative error detection code are cumulative cyclic redundant checking (CRC) codes.

27. The apparatus of claim 16, wherein the received cumulative error detection code and the new cumulative error detection code are cumulative checksums.

28. The apparatus of claim 16, wherein the device is also configured to transmit data.

29. The apparatus of claim 16, wherein the device is configured as a transceiver.

30. A system for implementing a protocol for detecting and correcting transmission errors in packet-based communications, the system comprising:
- a host computer comprising a first module for transmitting packets, where the first module is operable to implement the protocol for detecting and correcting transmission errors in packet-based communications, and wherein the first module comprises:
- a first device configured to transmit one or more packets, wherein each packet comprises a header and a footer and is configured for transmission as a single entity, wherein each packet comprises a plurality of transmission subunits, and wherein each of the plurality of transmission subunits does not have a header and a footer, and
- a first code generation unit coupled to the first device and configured to generate a cumulative error detection code for each of the plurality of transmission subunits of a packet,
- wherein the cumulative error detection code for each transmission subunit of the packet is generated based on data comprised in the each transmission subunit and a cumulative error detection code corresponding to one or more previously transmitted transmission subunits of the packet wherein the first error detection code is seeded with a value;
- a system interconnect coupled to the first module of the host computer; and
- a remote chassis coupled to the system interconnect and comprising a second module for receiving packets, wherein the second module is operable to implement the protocol for detecting and correcting transmission errors in packet-based communications, and wherein the second module comprises:
- a second device configured to receive each of the plurality of transmitted transmission subunits of the one or more packets, wherein each of the received transmission subunits of the packet comprises the data comprised in the received transmission subunit and the received cumulative error detection code, and
- a second code generation unit coupled to the second device and configured to generate a new cumulative error detection code for each of the received transmission subunits of the packet, wherein the new cumulative error detection code for each received transmission subunit of the packet is generated based on the received data comprised in the each received transmission subunit and a new cumulative error detection code corresponding to one or more previously received transmission subunits of the packet, and
- an error detection unit coupled to the second code generation unit and configured to compare the new cumulative error detection code to the received cumulative error detection code to determine if a transmission error occurred.

31. The system of claim 30, wherein the second module is operable to consume the received data comprised in the received transmission subunit if the new cumulative error detection code matches the received cumulative error detection code.

32. The system of claim 30, wherein the second module is operable to discard the received data comprised in the received transmission subunit if the new cumulative error detection code does not match the received cumulative error detection code.

33. The system of claim 30, wherein the first code generation unit is configured to generate the cumulative error detection code for each of the plurality of transmission subunits of the packet based on the data comprised in the transmission subunit and a first stored cumulative error detection code.

34. The system of claim 30, wherein the second code generation unit is configured to generate the new cumulative error detection code for each of the received transmission subunits of the packet based on the received data comprised in the received transmission subunit and a second stored cumulative error detection code.

35. A method for transmitting packets, which implements a protocol for detecting and correcting transmission errors in packet-based communications, the method comprising:
- generating a cumulative error detection code for each of a plurality of transmission subunits of a packet, wherein each of the plurality of transmission subunits does not have a header and footer; and
- transmitting each of the plurality of transmission subunits of the packet;
- wherein the cumulative error detection code for each transmission subunit of the packet is generated based on data comprised in the each transmission subunit and a cumulative error detection code corresponding to one or more previously transmitted transmission subunits of the packet wherein the first error detection code is seeded with a value.

36. The method of claim 35, wherein the cumulative error detection code for each of the plurality of transmission subunits of the packet, with the exception of a first transmission subunit, is generated based on the data comprised in the transmission subunit and a previously generated cumulative error detection code corresponding to the one or more previously transmitted transmission subunits of the packet.

37. The method of claim 35, wherein the cumulative error detection code for each of the plurality of transmission subunits of the packet is generated based on the data comprised in the transmission subunit and a stored cumulative error detection code.

38. The method of claim 35, wherein the cumulative error detection code is set to zero before generating the cumulative error detection code for a first transmission subunit of the packet, wherein the cumulative error detection code for the first transmission subunit of the packet is generated based on the data comprised in the first transmission subunit and the value zero.

39. The method of claim 38, wherein the cumulative error detection code for a second transmission subunit of the packet is generated based on the data comprised in the second transmission subunit and the cumulative error detection code associated with the first transmission subunit of the packet.

40. A method for receiving packets that implements a protocol for detecting and correcting transmission errors in packet-based communications, the method comprising:
- receiving one or more packets, wherein each packet comprises a header and a footer, wherein each packet comprises a plurality of transmission subunits, wherein each of the plurality of transmission subunits does not have a header and a footer, and wherein a particular received transmission subunit of the plurality of transmission subunits of a packet comprises data comprised in the particular received transmission subunit and a received cumulative error detection code;
- generating a new cumulative error detection code for each of the received transmission subunits of the packet, wherein the new cumulative error detection code for each received transmission subunit of the packet is generated based on the received data comprised in the each received transmission subunit and a new cumulative error detection code corresponding to one or more previously received transmission subunits of the packet wherein the first error detection code is seeded with a value; and comparing the new cumulative error detection code with the received cumulative error detection code to determine if a transmission error occurred.

41. The method of claim 40, wherein the received data associated with the received transmission subunit is consumed if the new cumulative error detection code matches the received cumulative error detection code.

42. The method of claim 40, wherein the received data associated with the received transmission subunit is discarded if the new cumulative error detection code does not match the received cumulative error detection code.

43. The method of claim 40, wherein the new cumulative error detection code for each of the received transmission subunits of the packet, with the exception of a first received transmission subunit, is generated based on the received data comprised in the received transmission subunit and a previously generated new cumulative error detection code corresponding to the one or more previously received transmission subunits of the packet.

44. The method of claim 40, wherein the new cumulative error detection code for each of the received transmission subunits of the packet is generated based on the received data comprised in the received transmission subunit and a stored cumulative error detection code.

45. A computer readable memory medium comprising program instructions, wherein the program instructions are executable by a processor to:

generate a cumulative error detection code for each of a plurality of transmission subunits of a packet, wherein each of the plurality of transmission subunits does not comprise a header and a footer; and transmit each of the plurality of transmission subunits of the packet;

wherein the cumulative error detection code for each transmission subunit of the packet is generated based on data comprised in the each transmission subunit and a cumulative error detection code corresponding to one or more previously transmitted transmission subunits of the packet wherein the first error detection code is seeded with a value.

46. A computer readable memory medium comprising program instructions, wherein the program instructions are executable by a processor to:

generate a new cumulative error detection code for each received transmission subunits of a packet, wherein each of the transmission subunits do not comprise a header and a footer, wherein the new cumulative error detection code for each received transmission subunit of the packet is generated based on received data comprised in the each received transmission subunit and a new cumulative error detection code corresponding to one or more previously received transmission subunits of the packet wherein the first error detection code is seeded with a value; and compare the new cumulative error detection code with a received cumulative error detection code to determine if a transmission error occurred.

* * * * *

UNITED STATES PATENT AND TRADEMARK OFFICE
CERTIFICATE OF CORRECTION

PATENT NO. : 7,607,070 B2  Page 1 of 1
APPLICATION NO. : 10/939858
DATED : October 20, 2009
INVENTOR(S) : Clark et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 519 days.

Signed and Sealed this

Twelfth Day of October, 2010

David J. Kappos
*Director of the United States Patent and Trademark Office*